(12) United States Patent
Suzuki et al.

(10) Patent No.: US 7,116,507 B2
(45) Date of Patent: Oct. 3, 2006

(54) STORAGE SYSTEM HAVING A POWER SOURCE STATE DETECTION UNIT

(75) Inventors: Hiroshi Suzuki, Sagamihara (JP); Hiromi Matsushige, Hiratsuka (JP); Masato Ogawa, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/235,231

(22) Filed: Sep. 27, 2005

(65) Prior Publication Data

US 2006/0007578 A1 Jan. 12, 2006

Related U.S. Application Data

(63) Continuation of application No. 10/788,401, filed on Mar. 1, 2004, now Pat. No. 7,023,642.

(30) Foreign Application Priority Data

Dec. 10, 2003 (JP) ............................. 2003-412487

(51) Int. Cl.
 *G11B 19/00* (2006.01)
(52) U.S. Cl. ..................... 360/71; 360/73.03; 713/330; 713/340
(58) Field of Classification Search ...................... None
See application file for complete search history.

(56) References Cited

U.S. PATENT DOCUMENTS

| | | | |
|---|---|---|---|
| 5,666,538 A | 9/1997 | DeNicola | |
| 5,768,117 A | 6/1998 | Takahashi et al. | 363/65 |
| 5,915,122 A | 6/1999 | Tsurumi | 713/330 |
| 6,286,108 B1 | 9/2001 | Kamo et al. | 713/330 |
| 6,499,073 B1 | 12/2002 | Wallach et al. | |
| 6,826,005 B1 | 11/2004 | Hakamata et al. | |
| 6,868,501 B1 | 3/2005 | Saitou et al. | 713/330 |
| 2003/0115413 A1 | 6/2003 | Wood et al. | 711/114 |
| 2003/0212857 A1 | 11/2003 | Pacheco et al. | 711/114 |
| 2004/0010660 A1 | 1/2004 | Konshak et al. | 711/114 |
| 2004/0068670 A1* | 4/2004 | Suzuki et al. | 713/300 |

FOREIGN PATENT DOCUMENTS

| | | |
|---|---|---|
| JP | 11-25571 | 7/1997 |
| JP | 2001-186655 | 12/1999 |

* cited by examiner

*Primary Examiner*—Hoa T. Nguyen
*Assistant Examiner*—James L Habermehl
(74) *Attorney, Agent, or Firm*—Reed Smith LLP; Stanley P. Fisher, Esq.; Juan Carlos A. Marquez, Esq.

(57) ABSTRACT

A storage system capable of reducing the start-up time of disk drives is provided. If a power source monitor circuit itself is normal (S93), the power source monitor circuit reads a detection signal from a detection circuit, and checks power sources (S94). If the power sources are normal (S95), all disks are spun up (S96). When the spin-up of all disks is completed (S98), processing is completed. If either of two power sources fails (S95), the power source monitor circuit reports the fact to a host control logical part (S99). The power source monitor circuit clears its internal counter to zero (S100) and issues a drive command to HDDs (S101). When the spin-up of all disks is completed (S103), processing is completed. If there is a disk which has not yet been spun up, the power source monitor circuit sets the internal counter to n+1 (S104) and returns to Step S101. N-number of HDDs are divided into groups respectively including six disks, six disks, four disks and one disk, and if the disks are driven in units of the groups, the power source monitor circuit sets the internal counter to n+Δn.

43 Claims, 9 Drawing Sheets

STORAGE SYSTEM HAVING A POWER SOURCE STATE DETECTION UNIT

CROSS-REFERENCES TO RELATED APPLICATIONS

This application is a Continuation application of U.S. application Ser. No. 10/788,401 filed on Mar. 1, 2004 now U.S. Pat. No. 7,023,642. Priority is claimed based on U.S. application Ser. No. 10/788,401 filed on Mar. 1, 2004, which claims priority to Japanese Patent Application No. 2003-412487, filed on Dec. 10, 2003, all of which is incorporated by reference.

BACKGROUND OF THE INVENTION

1. Field of the Invention

The present invention relates to a storage system communicably connected to a host computer or another storage system, as well as a control method for the storage system. More particularly, the invention relates to a disk unit section of the storage system and a drive control method for the disk unit section.

2. Description of the Related Art

A power source control device and a power source control method for a disk array apparatus have heretofore been proposed. The power source control device and the power source control method make it possible to restrain increases in size and cost of a power source device, in spite of making it possible to maintain the redundancy of the power source device when all hard disks (hereinafter referred to as "disks") provided in the disk array apparatus are in their STAND BY states and in their Operate W/R states. The disk array apparatus according to this proposal has a plurality of disks, a plurality of power source devices, and a power source control part. The power source control part adds together current supplied from the respective power source devices, and performs control to supply each of the disks with electric power according to the state of each individual one of the disks (refer to, for example, Patent Document 1).

Patent Document 1: JP-A-2001-186655

SUMMARY OF THE INVENTION

Recently, the mounting density of disks (HDDs) in a storage system is increasing, and the number of HDDs to be mounted in a storage system is also increasing. This tendency will become far more remarkable in the future.

In these circumstances, the present inventors have directed attention to the following problems.

(1) The start-up time of a disk (HDD) after the power off/on of a storage system becomes longer as the number of disks (HDDs) mounted in the storage system increases.

(2) For this reason, the starting time of the storage system needs be set to be considerably earlier than the actual operating time of the storage system.

(3) In the case where maintenance or inspection is to be performed on the storage system within a predetermined time, the time of maintenance or inspection needs to be reduced.

Specifically, approximately 30 seconds is normally required for the spin-up of a disk, and if a plurality of disks mounted for each power source circuit are spun up one by one, assuming that the number of mounted disks is 32, the time required for the spin-up of the entire disk array apparatus becomes a total of 16 minutes. (The power source circuit is a power source circuit for receiving electric power supplied from a commercial power source and outputting direct-current power of predetermined voltage. There are cases where two or more power source circuits are connected in parallel to disks which serve as loads, for the purpose of providing redundancy.) This 16 minutes is the time required for all the disks to normally complete their spin-up operations at a time, and if the first spin-up comes to an abnormal stop and the spin-up of all the disks is again executed, approximately 30 minutes which is approximately twice as long as the above-mentioned 16 minutes is spent.

For this reason, a drive power source of the disk array apparatus needs to be turned on at least 30 minutes before the operation starting time (start-up time) of the disk array apparatus, so that there is the problem that the actual working hours of an operator of the disk array apparatus become long. If the drive power source of the storage system is temporarily turned off so that work such as periodic inspection or maintenance of the disk array apparatus can be performed, the time (16 or 30 minutes) required for the above-mentioned spin-up is needed in addition to the time required for work such as periodic inspection or maintenance of the disk array apparatus, so that there is the problem that working time for periodic inspection and the like is shortened.

An object of the invention is to improve the efficiency or reliability of operation of a storage system.

Specifically, a first object of the invention is to provide a storage system capable of starting up a disk unit section in a short time.

A second object of the invention is to provide a storage system capable of driving a disk unit part by using a small power source (power capacity).

The invention provides a storage system which is communicably connected to a host computer (host system) and includes a disk unit section (storage section) having a plurality of hard disks and storing data transmitted from the host computer, a memory temporarily holding data transmitted from the host computer, a storage control section performing control of the storage section, and a disk unit section having direct-current voltage/direct-current voltage conversion parts (DC/DC converters), and the plurality of hard disks are collectively started up (are made to perform their spin-up operations) when the disk unit section is started.

The invention also provides a storage system which is communicably connected to a host computer (host system) and includes a disk unit section (storage section) having a plurality of hard disks and storing data transmitted from the host computer, a memory temporarily holding data transmitted from the host computer, and a storage control section performing control of the storage section, and before the disk unit section is started up, diagnosis is performed on at least any one of the state of a power source supplied to the disk unit section, the state of a power source path and the state of DC-DC converters, and the number of disks to be started up or the range of disk groups to be started up is changed on the basis of the diagnosis result.

A storage system according to the invention is communicably connected to a host computer or another storage system, and includes a channel adapter performing exchange of data transfer between the host system and the storage system, a cache memory temporarily holding data transmitted from the host computer through the channel adapters, disk unit sections having a plurality of disk drive parts in which are mounted a plurality of hard disks for storing data transmitted from the host computer, and a disk adapter receiving data temporarily held in the cache memory and outputting the received data to each of the hard disks. Each of the disk unit sections has a plurality of direct-current voltage/direct-current voltage conversion parts which are provided for the respective hard disks and individually supply direct-current power of predetermined voltage to the respective hard disks, a plurality of direct-current power supply parts connected in parallel to the respective direct-current voltage/direct-current voltage conversion parts and operative to receive electric power supplied from a commercial power source, generate direct-current power of predetermined voltage and supply the direct-current power to the respective direct-current voltage/direct-current voltage conversion parts, and a plurality of power state detection parts provided for the respective hard disks and operative to detect whether each of the direct-current voltage/direct-current voltage conversion parts and each of the direct-current voltage/direct-current voltage conversion parts are in their normal states. The disk adapter has a control part which controls the disk drive parts so that when the control part is notified by the power source state detecting parts that each of the direct-current voltage/direct-current voltage conversion parts and each of the direct-current power supply parts are in the normal states, the disk drive parts spin up all the hard disks at approximately the same time, and so that when the control part is notified by the power source state detecting parts that either one of the direct-current power supply parts is not in the normal state, the disk drive parts spin up the hard disks in units of groups into which the hard disks are divided so that a predetermined number of hard disks forms each of the groups.

In a preferred embodiment of the invention, when the control part is notified by the power source state detecting parts that either one of the direct-current power supply parts is not in the normal state, the control part, instead of or in addition to performing the control, shifts the spin-up-operation starting times of the respective hard disks from one another so that the idle seek times of the respective hard disks are prevented from overlapping one another.

In another embodiment of the invention, when the control part is notified by the power source state detecting parts that either one of the direct-current power supply parts is not in the normal state, the control part, instead of or in addition to performing the control, causes the hard disks to spin up in units of groups so that the idle seek times of the respective hard disks are prevented from overlapping one another, the hard disks being divided into the groups each formed by a predetermined number of hard disks.

In another preferred embodiment of the invention, when the control part is notified by the power source state detecting parts that either one of the direct-current power supply parts is not in the normal state, the control part, instead of or in addition to performing the control, shifts the spin-up-operation starting times of the respective hard disks from one another so that the spin-up-operation times of the respective hard disks are prevented from overlapping one another.

In another preferred embodiment of the invention, when the control part is notified by the power source state detecting parts that either one of the direct-current power supply parts is not in the normal state, the control part, instead of or in addition to performing the control, causes the hard disks to spin up in units of groups so that the spin-up-operation times of the respective hard disks are prevented from overlapping one another, the hard disks being divided into the groups each formed by a predetermined number of hard disks.

In a storage system according to another aspect of the invention, after a drive power source of the storage system has been turned on, if the power supply parts are normal, the disk drive parts are control so that the spin-up operations of the respective disks are performed at the same time.

In a storage system according to another aspect of the invention, drive power for spinning up the disks is supplied from the same power source.

In a storage system according to another aspect of the invention, a control method is adopted in which after the drive power source of the storage system has been turned on, if the power supply parts are normal, luminescent elements disposed on each of the disk drive parts are controlled to change from their slowly blinking states to their lighting states at the same time.

In a storage system according to another aspect of the invention, each of the disk drive parts has a first luminescent element which lights in a first color indicative of the operating state of each of the disks, a second luminescent element which lights in a second color when each of the disks is in an abnormal state, and a third luminescent element which lights in a third color.

In this construction, by appropriately controlling the driving of the first, second and third luminescent elements, it is possible to adopt a control method of executing various state displays. The state displays provide various state displays such as "waiting for spin-up", "issuing a spin-up command", "performing spin-up", "failed in spin-up" and "retrying spin-up". Accordingly, as in a first embodiment of the invention, even if all the disks are spun up at the same time, it is possible to individually confirm the state of each of the disks.

In a storage system according to another aspect of the invention, it is also possible to insert dummy access so that the idle seek times of the respective disks are prevented from overlapping one another.

In a storage system according to another aspect of the invention, it is also possible to shift the time of issuance of spin-up commands so that the spin-up times of the respective disks are shifted from one another.

In a storage system according to another aspect of the invention, a plurality of direct-current voltage/direct-current voltage conversion parts capable of absorbing the peaks of current consumption during the idle seeks of the respective disks are provided to correspond to the respective disks mounted in the disk drive parts.

The invention also provides a disk unit section capable of being mounted in a storage system which has a plurality of disks, a disk unit section (storage device) for storing data transmitted from a host system, and a memory for temporarily holding data transmitted from the host computer, and a storage control section which controls the storage device. The disk unit section having the plurality of disks has direct-current voltage/direct-current voltage conversion parts (DC-DC converters), and is capable of individually starting up (spinning up) disk groups each including a predetermined range of disks, when this disk system is to be started up.

The disk unit section further has a power state detection part for detecting whether each of the direct-current voltage/direct-current voltage conversion parts is in its normal state.

The invention also provides a disk unit section capable of being mounted in a storage system which has a plurality of disks, a disk unit section (storage device) for storing data transmitted from a host system, and a memory for temporarily holding data transmitted from the host computer, and a storage control section which controls the storage device.

The disk unit section has a direct-current voltage/direct-current voltage conversion part capable of absorbing the peaks of current consumption during the idle seeks of the respective disks.

According to the invention, it is possible to improve the efficiency or reliability of operation of a storage system. Specifically, the invention has any of the following advantages.

(1) It is possible to provide a storage system capable of starting up disk drives (a disk unit section) in a short time.

(2) It is possible to provide a storage system capable of driving disk drives (a disk unit section) by using a small power source (power capacity).

BRIEF DESCRIPTION OF THE DRAWINGS

The invention will become more readily appreciated and understood from the following detailed description of preferred embodiments of the invention when taken in conjunction with the accompanying drawings, in which.

DETAILED DESCRIPTION OF THE INVENTION

Preferred embodiments of the invention will be described below in detail with reference to the accompanying drawings.

Figure 1:
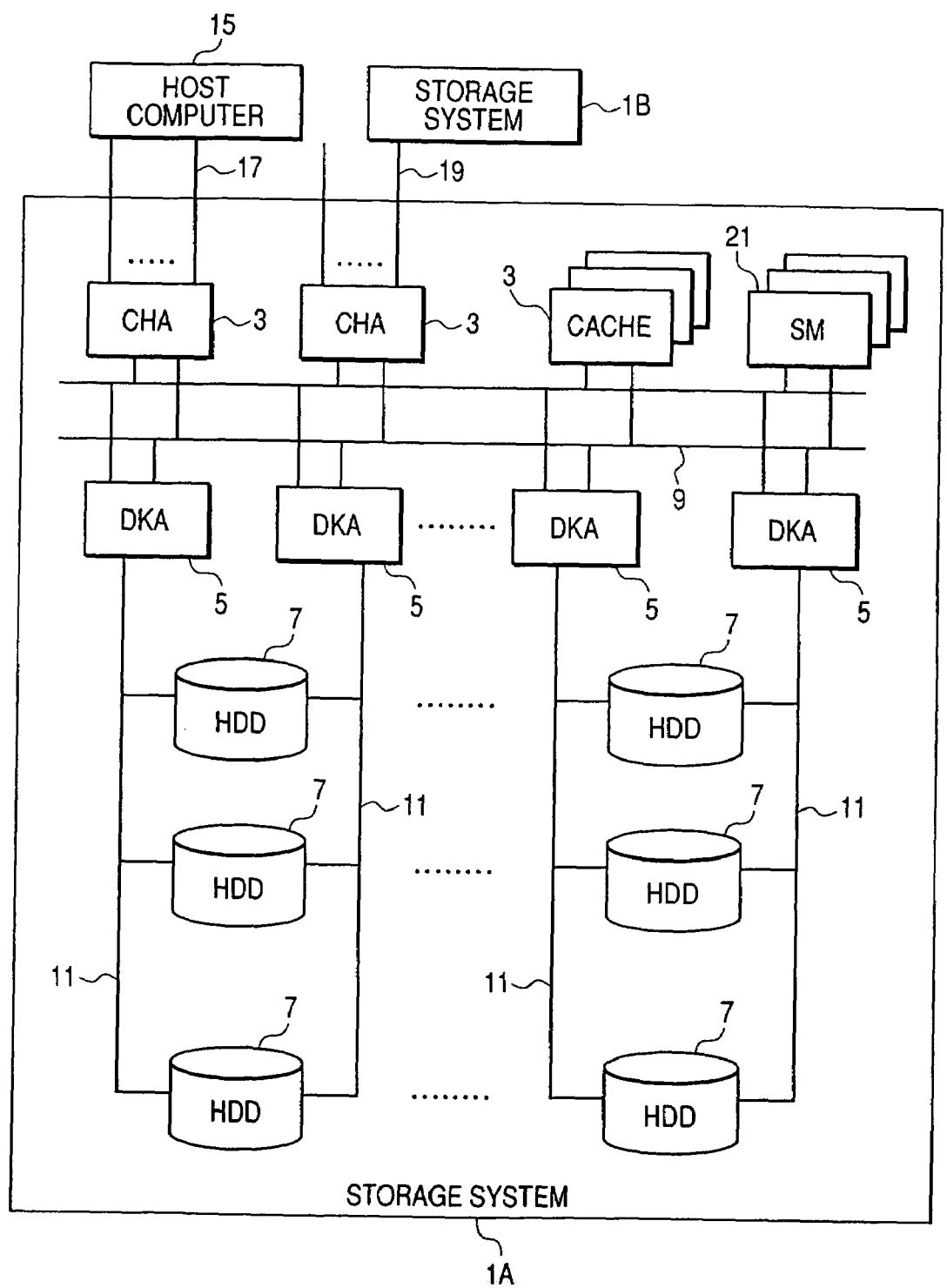
FIG. 1 is a block diagram showing a physical configuration of one example of a data processing system to which a storage system according to the invention is applied.

FIG. 1 is a block diagram showing a physical configuration of one example of a data processing system to which a storage system (hereinafter referred to also as the "disk array system" or the "storage control system") according to the invention is applied.

In this data processing system, as shown in FIG. 1, a host computer (hereinafter referred to as the "host system") 15 and a storage system 1A are connected to each other by a connection path 17. The storage system 1A and another storage system 1B are connected to each other by a connection path 19. The storage system 1B is used for holding copies of data stored in the storage system 1A.

The physical configuration of the storage system 1A which is a storage system for holding data to be copied is basically the same as the physical configuration of the storage system 1B which is a storage system for holding copied data, and the storage system according to the invention is applied to either of the storage systems 1A or 1B. FIG. 1 shows only the configuration of the storage system 1A for the convenience of illustration, and a detailed description will be given below regarding only the configuration of the storage system 1A, but the description of the configuration of the storage system 1B will be omitted.

As shown in FIG. 1, the storage system 1A includes at least one channel adapter (CHA) 3, at least one disk adapter (DKA) 5, and at least one cache memory (CACHE) 13. The storage system 1A includes, in addition to these parts, at least one shared memory (SM) 21, at least one physical storage device (for example, a hard disk drive (hereinafter referred to as the "HDD") 7, and at least one common path 9, and at least one connection line 11. The common path may also be replaced with a star connection.

The channel adapter 3, the disk adapter 5, the cache memory 13 and the shared memory 21 are interconnected by the common path 9. The common path 9 may also be duplicated (made redundant) to cope with failures of the common path 9. The disk adapter 5 and the corresponding ones of HDDs 7 are connected to one another by the connection line 11. Although not shown, a maintenance terminal for performing setting, monitoring, maintenance and the like on the storage system 1A is connected to all the channel adapters 3 and the disk adapters 5 by means of a dedicated line.

The channel adapter 3 is connected to the host system 15 or another storage system (for example, the storage system 1B) by the connection path 17 or the transparent acrylic cover 19. The channel adapter 3 controls data transfer between the host system 15 and the cache memory 13 or data transfer between another storage system (for example, 1B) and the cache memory 13. The disk adapter 5 controls data transfer between the cache memory 13 and the corresponding ones of the HDDs 7.

The cache memory 13 is a memory which temporarily holds data received from the host system 15 or another storage system (for example, 1B) or data read from the HDDs 7. The shared memory 21 is a memory shared by all of the channel adapters 3 and the disk adapters 5 in the storage system 1A. The shared memory 21 mainly stores and holds various kinds of information for control and management (for example, volume information, pair information, group information and pointer information) which are to be used by the channel adapters 3 and the disk adapters 5. The physical configuration of the storage system 1B is basically the same as the physical configuration of the storage system 1A.

A section which includes the channel adapters, the disk adapters, the cache memory and the shared memory and controls the storage devices (the HDDs) is hereinafter also called a storage device control section or a disk control logical part unit. A section which includes the plurality of HDDs shown in FIG. 1 is hereinafter also called a disk unit section.

The channel adapters and the disk adapters need not necessarily be different circuits (different control parts), and may also be formed as one control circuit (one control part).

Figure 2:
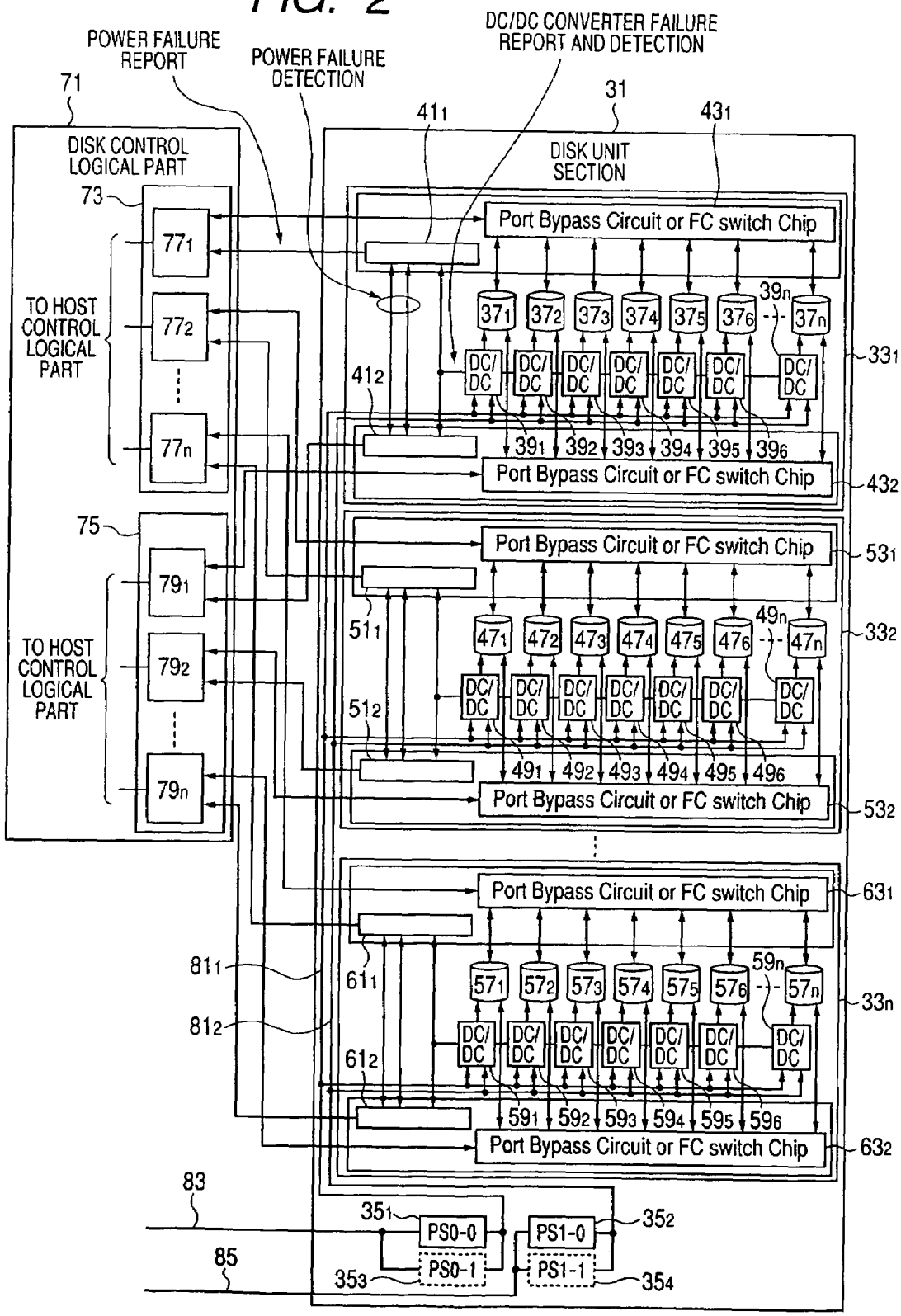
FIG. 2 is a block diagram showing details of the circuit construction of a storage system according to a first embodiment of the invention.

FIG. 2 is a block diagram showing details of the circuit construction of a storage system according to a first embodiment of the invention.

Referring to FIG. 2, a disk unit section 31 (which is hereinafter also referred to as a disk array or a disk housing section) includes a plurality of disk units (disk drive parts) having the same construction as denoted by reference numerals $33_1$ to $33_n$ by way of example and a plurality of (in FIG. 2, two) power source circuits having the same construction (the same specifications) as denoted by reference numerals $35_1$ and $35_2$ by way of example. The disk unit $33_1$ includes a plurality of disks $37_1$ to $37_n$, a plurality of direct current/direct current (DC/DC) converters $39_1$ to $39_n$, a plurality of (in FIG. 2, two) power failure detection circuits $41_1$ and $41_2$, and a plurality of (in FIG. 2, two) disk connection networks $43_1$ and $43_2$. The disk connection networks $43_1$ and $43_2$ are port bypass circuits or Fibre Channel switch chips (FC Switch Chips), and the first embodiment will be described on the assumption that the disk connection networks $43_1$ and $43_2$ are Fibre Channel switches.

Similarly to the disk unit $33_1$, the disk unit $33_2$ includes a plurality of disks $47_1$ to $47_n$, a plurality of DC/DC converters $49_1$ to $49_n$, a plurality of (in FIG. 2, two) power failure detection circuits $51_1$ and $51_2$, and a plurality of (in FIG. 2, two) Fibre Channel switches $53_1$ and $53_2$. In addition, similarly to the disk unit $33_1$ and the disk unit $33_2$, the disk unit $33_n$ includes a plurality of disks $57_1$ to $57_n$, a plurality of DC/DC converters $59_1$ to $59_n$, a plurality of (in FIG. 2, two) power failure detection circuits $61_1$ and $61_2$, and a plurality of (in FIG. 2, two) Fibre Channel switches $63_1$ and $63_2$. The plurality of disks 7 shown in FIG. 1 correspond to the respective disks $37_1$ to $37_n$, $47_1$ to $47_n$ and $57_1$ to $57_n$, respectively.

A disk control logical part unit 71 has a circuit construction corresponding to that of each of the disk adapters 5 shown in FIG. 1, and includes two disk control logical parts having the same construction as denoted by reference numerals 73 and 75 by way of example. The disk control logical part 73 has a plurality of Fiber Channel (FC) control logic and power source monitor circuits $77_1$ to $77_n$, and the disk control logical part 75 has a plurality of Fiber Channel (FC) control logic and power source monitor circuits $79_1$ to $79_n$.

Parts which constitute each of the above-described disk units $33_1$ to $33_n$ and parts which constitute the disk control logical part unit 71 will be described below in detail. Since any of the disk units $33_1$ to $33_n$ has the same circuit construction, only the circuit construction of the disk unit $33_1$ will be described below in detail, and the circuit constructions of the remaining disk units $33_2$ to $33_n$ will be described as occasion demands and the detailed description of the same parts and portions will be omitted.

In the disk unit section 31, each of the power source circuits $35_1$ and $35_2$ includes a rectification circuit and a smoothing circuit for receiving alternating-current power supplied from the respective one of a first and a second power sources 83 and 85 and converting the alternating-current power to direct-current power. The power source circuits $35_1$ and $35_2$ can be duplicated, respectively, by connecting in parallel a power source circuit $35_3$ (shown by dashed lines) having the same construction as the power source circuit $35_1$ to the power source circuit $35_1$ and by connecting in parallel a power source circuit $35_4$ (shown by dashed lines) having the same construction as the power source circuit $35_2$ to the power source circuit $35_2$.

In the disk unit section 31, a first power supply line $81_1$ is disposed so that electric power can be supplied from the first power source 83 (which supplies an alternating-current power of, for example, 200 V or 400 V as industrial power) to each of the disks $37_1$ to $37_n$, $47_1$ to $47_n$ and $57_1$ to $57_n$ through the power source circuit $35_1$ and the respective one of the DC/DC converters $39_1$ to $39_n$, $49_1$ to $49_n$ and $59_1$ to $59_n$. Similarly, in the disk unit section 31, a second power supply line $81_2$ is disposed so that electric power can be supplied from the second power source 85 (which supplies an alternating-current power of, for example, 200 V or 400 V as industrial power) to each of the disks $37_1$ to $37_n$, $47_1$ to $47_n$ and $57_1$ to $57_n$ through the power source circuit $35_2$ and the respective one of the DC/DC converters $39_1$ to $39_n$, $49_1$ to $49_n$ and $59_1$ to $59_n$. Namely, in the first embodiment, a power supply line for supplying electric power from a power source to each disk ($37_1$ to $37_n$, $47_1$ to $47_n$ and $57_1$ to $57_n$) is duplicated by the first power supply line $81_1$ and the second power supply line $81_2$. The power supply line can also be multiplexed.

The DC/DC converter $39_1$ is associated with the disk $37_1$, the DC/DC converter $39_2$ is associated with the disk $37_2$, the DC/DC converter $39_3$ is associated with the disk $37_3$, the DC/DC converter $39_4$ is associated with the disk $37_4$, the DC/DC converter $39_5$ is associated with the disk $37_5$, the DC/DC converter $39_6$ is associated with the disk $37_6$, and the DC/DC converter $39_n$ is associated with the disk $37_n$, and the DC/DC converters $39_1$ to $39_n$ are respectively disposed in the vicinity of the disks $37_1$ to $37_n$ in the disk unit $33_1$. The respective DC/DC converters are desirably provided on disk cases in which the respective disks are housed. The respective DC/DC converters $39_1$ to $39_n$ convert (decrease) direct-current voltages supplied from the power source circuit $35_1$ through the first power supply line $81_1$ or direct-current voltages supplied from the power source circuit $35_1$ through the second power supply line $81_2$, into predetermined voltages, and supply the predetermined voltages to the corresponding ones of the disks $37_1$ to $37_n$.

The power failure detection circuit $41_1$ detects the presence or absence of a failure of the power source circuit $35_1$ (and/or $35_3$) or a failure of the first power source 83 through the first power supply line $81_1$ and reports the detected result to the FC control logic and power source monitor circuit $77_1$. In addition, the power failure detection circuit $41_1$ detects the presence or absence of a failure of the power source circuit $35_2$ (and/or $35_4$) or a failure of the second power source 85 through the second power supply line $81_2$ and reports the detected result to the FC control logic and power source monitor circuit $77_1$. The power failure detection circuit $41_1$ further detects the presence or absence of a failure of each of the DC/DC converters $39_1$ to $39_n$ and reports the detected result to the FC control logic and power source monitor circuit $77_1$.

The power failure detection circuit $41_2$ also performs a detection operation similar to that of the power failure detection circuit $41_1$. Namely, the power failure detection circuit $41_2$ detects the presence or absence of a failure of the power source circuit $35_1$ (and/or $35_3$) or a failure of the first power source 83 through the first power supply line $81_1$ and reports the detected result to the FC control logic and power source monitor circuit $79_1$. In addition, the power failure detection circuit $41_2$ detects the presence or absence of a failure of the power source circuit $35_2$ (and/or $35_4$) or a failure of the second power source 85 through the second power supply line $81_2$ and reports the detected result to the FC control logic and power source monitor circuit $79_1$. The power failure detection circuit $41_2$ further detects the presence or absence of a failure of each of the DC/DC converters $39_1$ to $39_n$ and reports the detected result to the FC control logic and power source monitor circuit $79_1$.

As is apparent from the above-described content, the failure detection made by the power failure detection circuits ($41_1$ and $41_2$) and the power-source monitoring performed by the FC control logic and power source monitor circuits ($77_1$ to $77_n$ and $79_1$ to $79_n$) are also duplicated.

The Fibre Channel switch $43_1$ performs an ON/OFF operation in accordance with a command from the FC control logic and power source monitor circuit $77_1$ under the control of the FC control logic and power source monitor circuit $77_1$, thereby connecting/disconnecting each individual one of the HDDs $37_1$ to $37_n$ and the FC control logic and power source monitor circuit $77_1$. Similarly to the Fibre Channel switch $43_1$, the Fibre Channel switch $43_2$ performs an ON/OFF operation in accordance with a command from the FC control logic and power source monitor circuit $79_1$ under the control of the FC control logic and power source monitor circuit $79_1$, thereby connecting/disconnecting each individual one of the HDDs $37_1$ to $37_n$ and the FC control logic and power source monitor circuit $79_1$.

Then, in the disk control logical part 73 which constitutes the disk control logical part unit 71, the FC control logic and power source monitor circuit $77_1$ receives the detection signal from the power failure detection circuit $41_1$ of the disk unit $33_1$ and executes predetermined arithmetic processing. At the same time, the FC control logic and power source monitor circuit $77_1$ places the Fibre Channel switch $43_1$ under its control and causes the Fibre Channel switch $43_1$ to perform an ON/OFF operation, thereby outputting drive command signals or drive stop command signals to the respective disks $37_1$ to $37_n$ through the Fibre Channel switch $43_1$ and controlling the operations, such as start/stop, of the respective disks $37_1$ to $37_n$.

In the disk control logical part 75 which constitutes the disk control logical part unit 71, similarly to the FC control logic and power source monitor circuit $77_1$, the FC control logic and power source monitor circuit $79_1$ receives the detection signal from the power failure detection circuit $41_2$ of the disk unit $33_1$ and executes predetermined arithmetic processing. At the same time, the FC control logic and power source monitor circuit $79_1$ places the Fibre Channel switch $43_2$ under its control and causes the Fibre Channel switch $43_2$ to perform an ON/OFF operation, thereby outputting drive command signals or drive stop command signals to the respective disks $37_1$ to $37_n$ through the Fibre Channel switch $43_2$ and controlling the operations, such as start/stop, of the respective disks $37_1$ to $37_n$. Incidentally, the disk control logic and power source monitor circuits $77_2$ to $77_n$ and the disk control logic and power failure monitor circuits $79_2$ to $79_n$ are similar in construction to the above-described circuits $77_1$ to $77_n$, and the detailed description of the circuits $77_2$ to $77_n$ and $79_2$ to $79_n$ is omitted.

Each of the FC control logic and power source monitor circuit $77_1$, the FC control logic and power source monitor circuit $77_2$, the FC control logic and power source monitor circuit $77_n$, the FC control logic and power source monitor circuit $79_1$, the FC control logic and power source monitor circuit $79_2$, and the FC control logic and power source monitor circuit $79_n$ communicates with a host control logical part (not shown) and performs exchange of mutually necessary data.

When drive command signals are outputted from the FC control logic and power source monitor circuit $77_1$ through, for example, the Fibre Channel switch $43_1$ which is closed, the disks $37_1$ to $37_n$ are individually started (spun up) in order in accordance with the drive command signals. In this spin-up operation, from the moment when each of the disks $37_1$ to $37_n$ starts a rotating operation until the moment when it reaches a steady rotating speed, processing is performed which accelerates each of the disks $37_1$ to $37_n$ and drives (moves) a head to enable complete read/write of data. The movement of the head is called idle seek, and is executed periodically (namely, automatically at the starting time of the corresponding one of the disks) to prevent dust or the like from accumulating between the head and the disk. Each of the disks $37_1$ to $37_n$ arbitrarily measures time and executes the idle seek. The time required for the idle seek is normally 2–3 msec, and the interval between idle seeks is normally approximately several seconds.

In the above-described starting processing, the FC control logic and power source monitor circuit $77_1$ executes a self-diagnosis to check whether each of the disks $37_1$ to $37_n$ can correctly operate under the control of the FC control logic and power source monitor circuit $77_1$, for example, whether communication can be correctly performed between each of the disks $37_1$ to $37_n$ and the cache memory 13 shown in FIG. 1 through the FC control logic and power source monitor circuit $77_1$ and the host control logical part (not shown).

Figure 3:
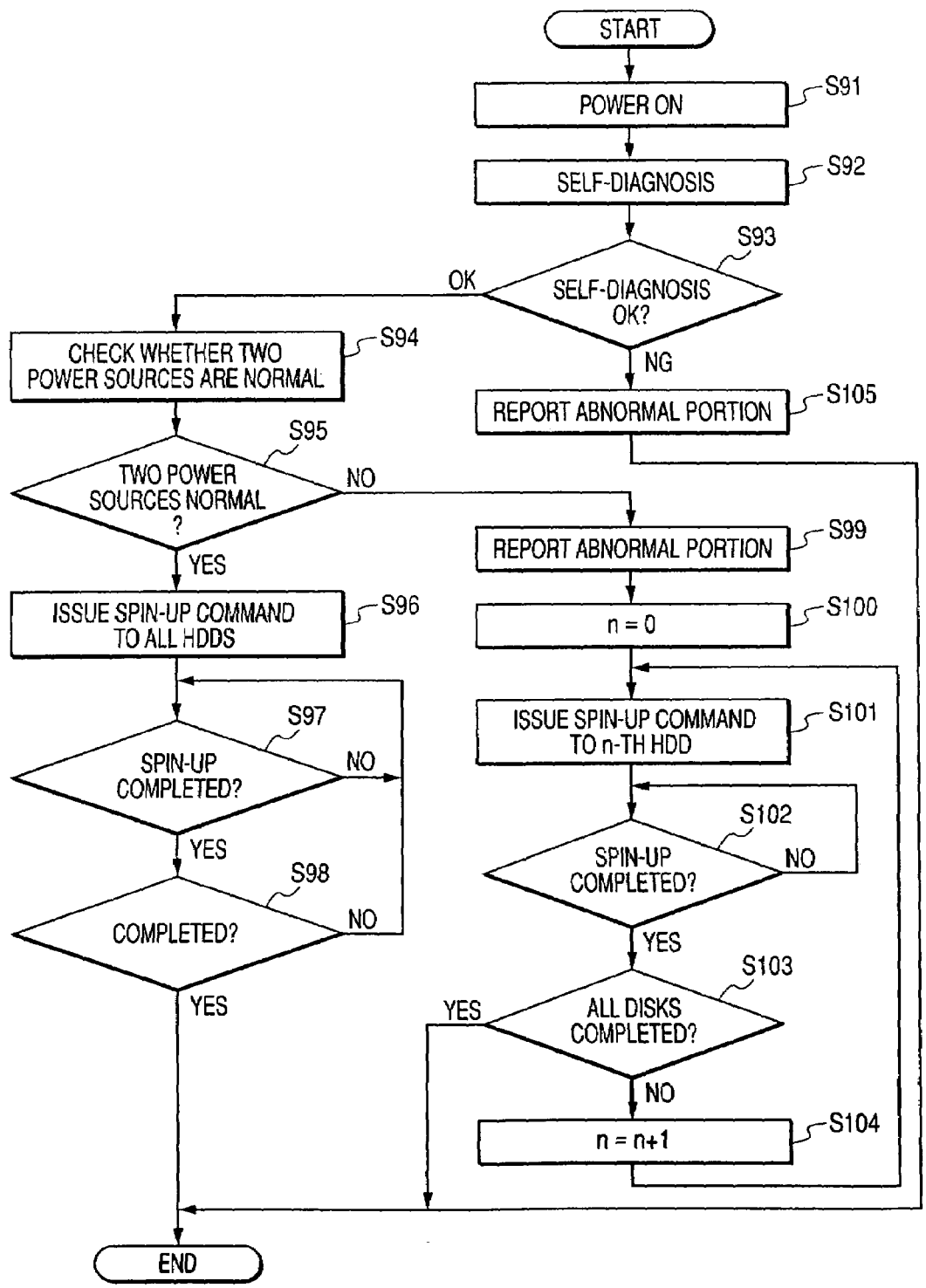
FIG. 3 is a flowchart showing the flow of processing to be executed in the construction of the storage system shown in FIG. 2 when all disks mounted in a disk unit are to be driven at the same time.

FIG. 3 is a flowchart showing the flow of processing to be executed in the construction of the storage system shown in FIG. 2 when all the disks $37_1$ to $37_n$ mounted in the disk unit $33_1$ are to be driven at the same time. In the flowchart shown in FIG. 3, the number of HDDs to be spun up at the same time is changed according to the results of diagnoses of the first power source 83 and the second power source 85. Incidentally, there is a case where spinning up all HDDs at the same time signifies issuing spin-up commands to all HDDs at the same time. In addition, even if all HDDs are not spun up at completely the same time, a small temporal deviation does not cause any problem, as long as the deviation is accommodated within the range in which the first embodiment can serve its advantage.

In the flowchart shown in FIG. 3, first, when a drive power source of the storage system is turned on (Step S91), the FC control logic and power source monitor circuit $77_1$ executes the previously-described self-diagnosis operation (Step S92). If the FC control logic and power source monitor circuit $77_1$ determines from this self-diagnosis operation that there is no failure (Step S93, OK), the FC control logic and power source monitor circuit $77_1$ reads a detection signal outputted from the power failure detection circuit $41_1$, and checks whether the first power source 83 and the second power source 85 are normal (Step S94). If the FC control logic and power source monitor circuit $77_1$ determines from this check that both of the first and second power sources 83 and 85 are normal (Step S95, YES), the FC control logic and power source monitor circuit $77_1$ outputs drive command signals to all the disks $37_1$ to $37_n$ through the Fiber Channel switch $43_1$, and causes all the disks $37_1$ to $37_n$ to spin up (Step S96).

Then, the FC control logic and power source monitor circuit $77_1$ checks whether each individual one of the disks $37_1$ to $37_n$ has completed its spin-up operation (Step S97, YES/NO), and then checks whether all the disks $37_1$ to $37_n$ have completed their spin-up operations (Step S98, YES/NO). When the FC control logic and power source monitor circuit $77_1$ confirms that all the disks $37_1$ to $37_n$ have completed the spin-up operations (Step S98, YES), the FC control logic and power source monitor circuit $77_1$ completes a series of processing operations.

If the FC control logic and power source monitor circuit $77_1$ determines from the check made in Step S95 that a failure (malfunction) has occurred in either of the first and second power sources 83 or 85 (Step S95, NO), the FC control logic and power source monitor circuit $77_1$ reports a portion in which the failure (malfunction) has occurred, to the host control logical part (not shown) (Step S99). Then, to start individually driving (spinning up) each of the HDDs $37_1$ to $37_n$, the FC control logic and power source monitor circuit $77_1$ clears to zero the count value of an internal counter (not shown) for setting the identification number of a disk to be driven during the driving of each individual one of the disks $37_1$ to $37_n$ (Step S100), and outputs a drive command signal to the disk (Step S101) (This is because the identification number of the first disk is set to "0").

Then, the FC control logic and power source monitor circuit $77_1$ checks whether each individual one of the disks $37_1$ to $37_n$ has completed its spin-up operation (Step S101, YES/NO), and then checks whether all the disks $37_1$ to $37_n$ have completed their spin-up operations (Step S103, YES/NO). When the FC control logic and power source monitor circuit $77_1$ confirms that all the disks $37_1$ to $37_n$ have completed the spin-up operations (Step S103, YES), the FC control logic and power source monitor circuit $77_1$ completes a series of processing operations. If the check made in Step S103 shows that the spin-up of all the disks $37_1$ to $37_n$ has not yet been completed, the FC control logic and power source monitor circuit $77_1$ sets the count value of the internal counter (not shown) to n+1 (Step S104), and returns to Step S101. In Step S104, a plurality of disks $37_1$ to $37_n$ may also be collectively spun up instead of spinning up the disks $37_1$ to $37_n$ one by one. For example, in the case where the disks $37_1$ to $37_n$ are divided into groups which respectively include six disks, six disks, four disks and one disk, and are to be driven in units of the groups, the FC control logic and power source monitor circuit $77_1$ sets the internal counter (not shown) to, for example, n+$\Delta$n.

If the FC control logic and power source monitor circuit $77_1$ determines from the self-diagnosis made in Step S93 that there is a failure (Step S93, NG), this indicates that a failure has occurred in the FC control logic and power source monitor circuit $77_1$ itself. Accordingly, the FC control logic and power source monitor circuit $77_1$ interrupts a series of processing operations immediately after having reported the occurrence of the failure to the host control logical part (not shown) (Step S105).

Figure 4:
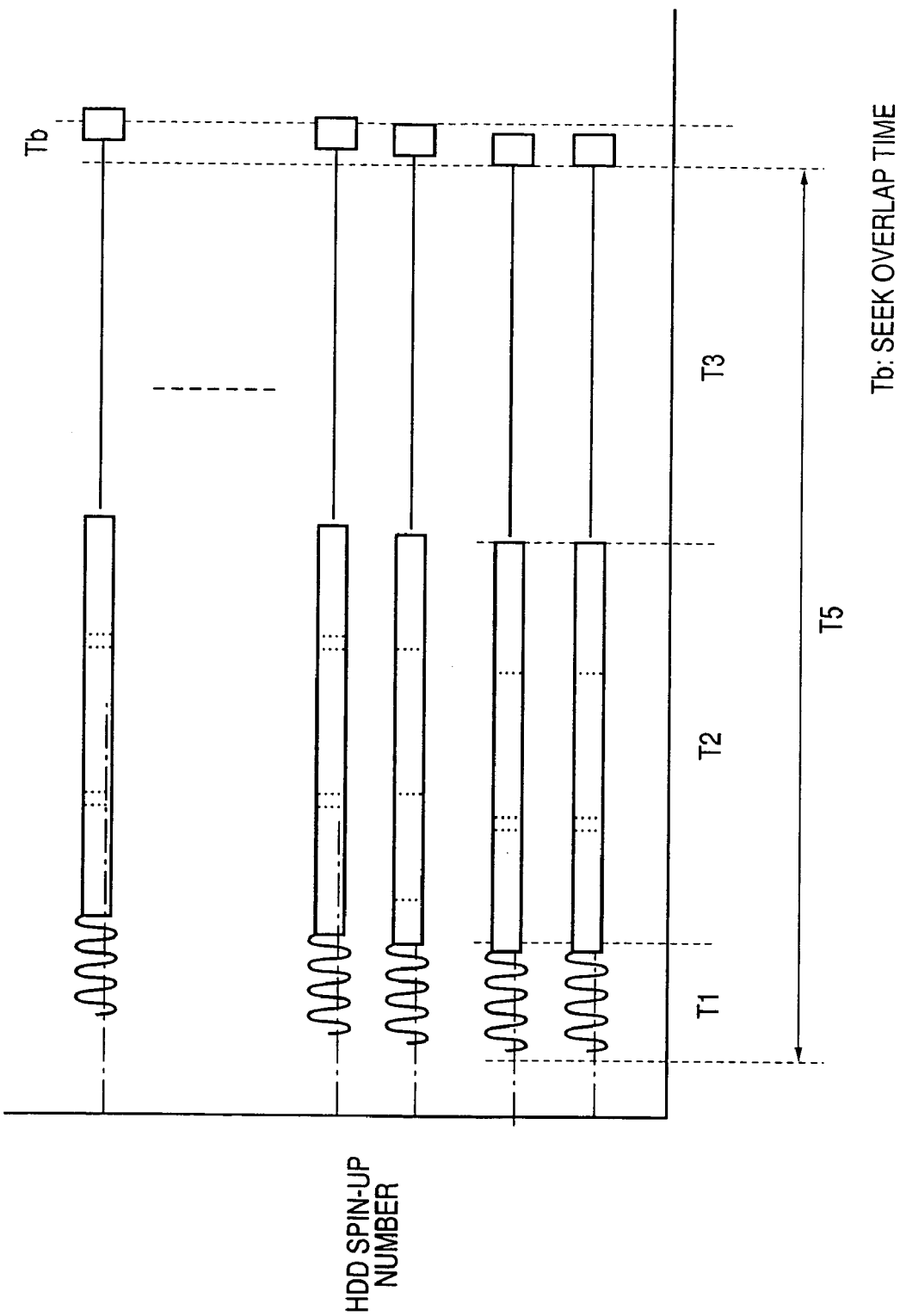
FIG. 4 is a view showing the timing of spin-up of each of the disks in the case where a Fiber Channel (FC) control logic and power source monitor circuit drives all the disks at the same time in the flowchart shown in FIG. 3.

FIG. 4 is a view showing the timing of spin-up of each of the disks $37_1$ to $37_n$ in the case where the FC control logic and power source monitor circuit $77_1$ drives all the disks $37_1$ to $37_n$ at the same time, as in the flowchart shown in FIG. 3.

In FIG. 4, the vertical axis represents the number of the disks $37_1$ to $37_n$ to be spun up, while the horizontal axis represents time. Time $T_1$ represents the time required to issue a spin-up command to be given to each of the disks $37_1$ to $37_n$ by the FC control logic and power source monitor circuit $77_1$ through the Fibre Channel switch $43_1$, time $T_2$ represents the processing time of spin-up operation, and time $T_3$ represents the interval between idle seeks. Time $T_4$ represents (idle) seek time, and time $T_5$ represents the time taken until all the disks $37_1$ to $37_n$ complete their spin-up operations. Time $T_2$ is approximately 30–60 seconds, time $T_3$ is approximately several seconds, and time $T_4$ is approximately 2–3 microseconds.

Accordingly, since all the disks $37_1$ to $37_n$ are spun up at the same time, the time required until disks are mounted in HDDs and the spin-up of the disks is completed so that the disks reach their operable states does not depend on the number of disks mounted in the HDDs, and becomes approximately 30 seconds which is approximately equal to the time required until one disk is mounted in a HDD and the entire disk unit section 31 reaches its operable state. In addition, in the flowchart shown in FIG. 3, as described above in connection with Step S95, in the case where a disk does not normally spin up and fails to start, owing to the occurrence of a failure (malfunction) in either of the first and second power sources 83 or 85, the disk which has failed to spin up needs to be again spun up. In this case as well, if all of the remaining disks are spun up at the same time, the entire disk unit section 31 reaches the operable state within a maximum of approximately one minute. Accordingly, the time required until disks are mounted in HDDs and reach their operable states can be greatly reduced compared to related arts.

As described above, when all the disks $37_1$ to $37_n$ are spun up at the same time, there is a possibility that the idle seeks of the individual disks $37_1$ to $37_n$ are performed at the same time, as shown in FIG. 4. In the storage system having the circuit construction shown in FIG. 2 (a circuit construction in which so-called uninterruptible maintenance is realized), the output power capacity of a power source which supplies electric power to the storage system is set to twice (a parallel connection of two power sources (the power source circuits $35_1$ and $35_2$) each capable of outputting 100% of the power consumption of all the disks $37_1$ to $37_n$) or 1.5 times (a parallel connection of three power sources each capable of outputting 50% of the power consumption of all the disks $37_1$ to $37_n$) as large as the power consumption of the disks $37_1$ to $37_n$, $47_1$ to $47_n$, and $57_1$ to $57_n$ which are respectively contained in the disk units $33_1$ to $33_n$.

The power consumption of each of the disks $37_1$ to $37_n$ is divided into the idle-time power consumption of each of the disks $37_1$ to $37_n$, the seek-time average power consumption of each of the disks $37_1$ to $37_n$, the spin-up-time power consumption of each of the disks $37_1$ to $37_n$, and the seek-time peak power consumption of each of the disks $37_1$ to $37_n$. The ratio of these power consumptions, that is to say, the ratio of the idle-time power consumption to the seek-time average power consumption to the spin-up-time power consumption to the seek-time peak power consumption, is 35:65:100:110, where 100 is the spin-up-time power consumption of each of the disks $37_1$ to $37_n$. Namely, the magnitude of the seek-time peak power consumption of each of the disks $37_1$ to $37_n$ is approximately 1.7 times as large as the seek-time average power consumption.

It is not preferable, however, that as each of the power source capacities is increased so that electric power can be supplied according to the magnitude of the idle-seek peak power consumption, the overall size of the storage system increase and an increase in cost be incurred. In addition, it is not preferable to inefficiently set each of the power source capacities according to the magnitude (instantaneous value) of power consumption which occurs for only an extremely short time of 2–3 msec. For this reason, in the first embodiment, a first power source capacity and a second power source capacity (the capacities of the respective power source circuits $35_1$ and $35_2$) are set so that the input voltage to each of the DC/DC converters $39_1$ to $39_n$, $49_1$ to $49_n$ and $59_1$ to $59_n$ shown in FIG. 2 becomes the above-mentioned "65", namely, at least the idle-seek-time mean power consumption, "65", of each of the disks $37_1$ to $37_n$ can be satisfied.

Even if the two power source capacities are set in this manner, the seek-time peak power consumption, "110", which occurs for only an extremely short time of 2–3 msec can be sufficiently absorbed by the capacitance of a capacitor (not shown) provided in each of the DC/DC converters $39_1$ to $39_n$, $49_1$ to $49_n$ and $59_1$ to $59_n$. Accordingly, there is no problem even if each of the two power source capacities is set to "65" which is approximately 0.6 times as large as the seek-time peak power consumption, "110". Incidentally, when the two power sources (the power source circuits $35_1$ and $35_2$) are normal, the electric power, "65", is supplied in parallel from the two power sources to each of the DC/DC converters $39_1$ to $39_n$, $49_1$ to $49_n$ and $59_1$ to $59_n$, so that electric power of "130" in total is supplied to each of the DC/DC converters $39_1$ to $39_n$, $49_1$ to $49_n$ and $59_1$ to $59_n$. Accordingly, it is possible to cope with the spin-up-time power consumption, "100", of each of the HDDs $37_1$ to $37_n$ with a sufficient margin of "30".

Incidentally, when both of the first and second power sources (the power source circuits $35_1$ and $35_2$) are normal, there is no problem even if the disks $37_1$ to $37_n$ spin up at the same time. Assuming that a failure occurs in either one of the power sources during the spin-up of each of the disks $37_1$ to $37_n$, the spin-up-time power consumption, "100", cannot be satisfied, because the amount of electric power supplied from a normal one of the power sources is "65". However, since the time required for spin-up operation is as short as approximately 30 seconds, the probability that either of the power sources fails is small, and no great problem occurs even if power sources of large capacity are not used as the two power sources (the power source circuits $35_1$ and $35_2$).

As described above, according to the first embodiment of the invention, as long as the power source circuit $35_1$ and the first power supply line $81_1$ are normal and the power source circuit $35_2$ and the second power supply line $81_2$ are also normal, each of the disks $37_1$ to $37_n$ can be spun up at the same time, and the time required for spin-up operation in this case can be made as short as approximately 30 seconds.

If a failure occurs in either of the power source circuits $35_1$ or $35_2$, the spin-up operation is divided into four steps and the number of disks specified in each of the steps is spun up. Accordingly, the time required for this spin-up operation can be made approximately 2 minutes (30 seconds×4). In this case, it is possible to save wasteful power consumption by turning off drive power sources associated with the remaining disks except the number of disks specified in each of the steps and the number of disks that have completed their spin-up operations.

According to the first embodiment, since the above-described advantage can be achieved, the drive power source of the storage system needs only to be turned on approximately 5 minutes before the starting time of operation of the storage system, and the actual working hours of an operator and the like can be reduced by approximately 25 minutes compared to related art storage systems. In the case where the drive power source of the storage system is temporarily turned off during periodic inspection or maintenance of the storage system, a time period which can be used for substantial inspection work or maintenance work becomes a time period obtainable by subtracting approximately 5 minutes from a given time period for inspection work or maintenance work. This means that working time usable for periodic inspection and maintenance increases by approximately 25 minutes compared to related art storage systems.

Figure 5:
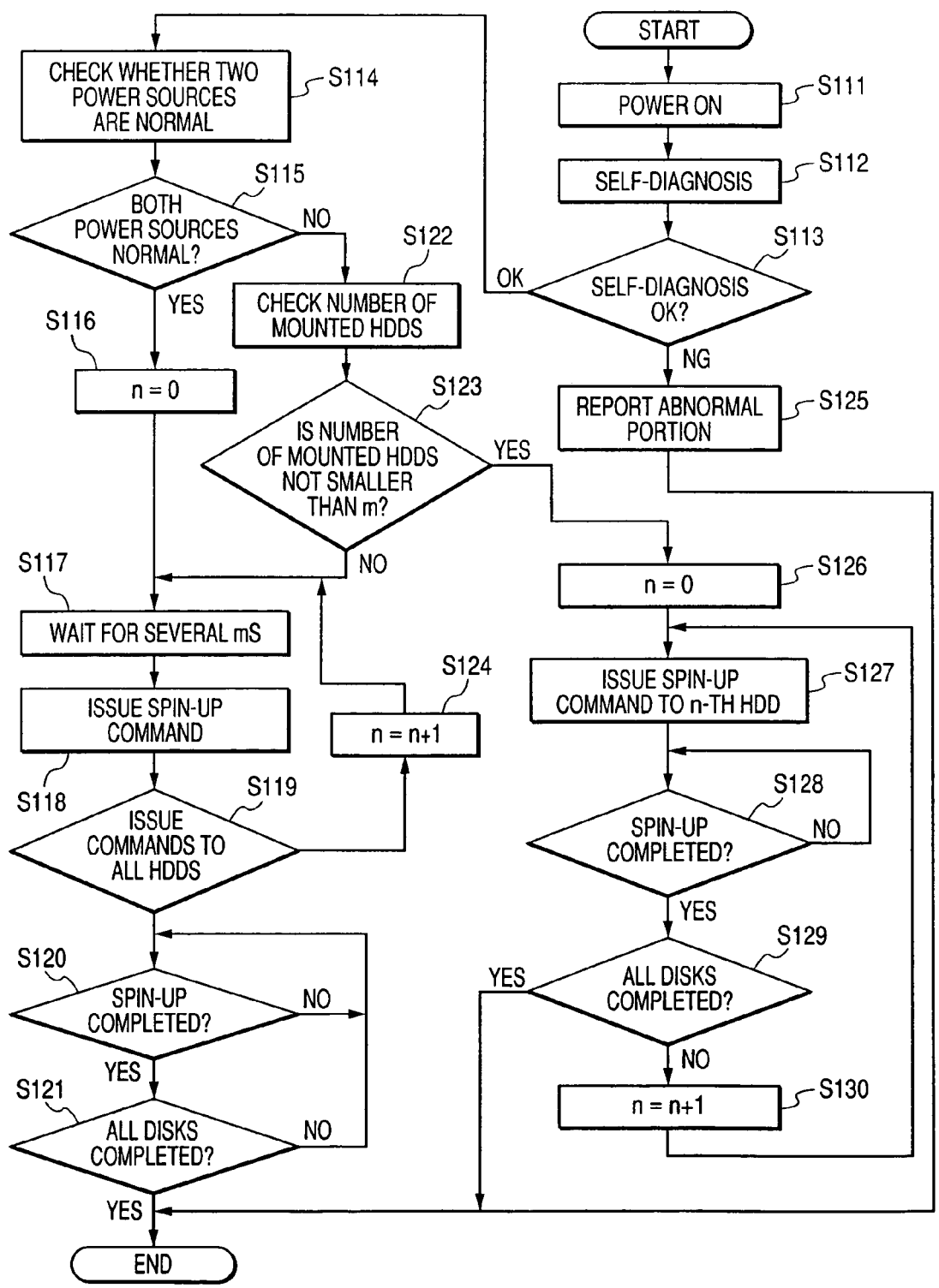
FIG. 5 is a flowchart showing the flow of processing to be executed when each of the disks mounted in the disk unit according to a modification of the first embodiment of the invention is to be driven (spun up)

FIG. 5 is a flowchart showing the flow of processing to be executed when each of the disks $37_1$ to $37_n$ mounted in the disk unit $33_1$ according to a modification of the first embodiment of the invention is to be driven (spun up).

In the flowchart shown in FIG. 5, first, when the drive power source of the storage system is turned on (Step S111), the FC control logic and power source monitor circuit $77_1$ executes the previously-described self-diagnosis operation (Step S112). If the FC control logic and power source monitor circuit $77_1$ determines from this self-diagnosis operation that there is no failure (Step S113, OK), the FC control logic and power source monitor circuit $77_1$ reads a detection signal outputted from the power failure detection circuit $41_1$, and checks whether the first power source 83 and the second power source 85 are normal (Step S114). If the FC control logic and power source monitor circuit $77_1$ determines from this check that both of the first and second power sources 83 and 85 are normal (Step S115, YES), the FC control logic and power source monitor circuit $77_1$ clears to zero the count value of the internal counter (not shown) for setting the identification number of a disk to be driven during the driving of each individual one of the disks $37_1$ to $37_n$, in order to start individually driving (spinning up) each of the disks $37_1$ to $37_n$ (Step S116) (This is because the identification number of the first disk is set to "0").

Then, the FC control logic and power source monitor circuit $77_1$ waits until approximately several microseconds passes (Step S117). After that, the FC control logic and power source monitor circuit $77_1$ issue drive command signals to the disks $37_1$ to $37_n$ (Step S118), and checks whether the drive command signals have been issued to all the disks $37_1$ to $37_n$ through the Fibre Channel switch $43_1$ (Step S119). If the FC control logic and power source monitor circuit $77_1$ confirms from this check that the drive command signals have been issued to all the disks $37_1$ to $37_n$ (Step S119, YES), the FC control logic and power source monitor circuit $77_1$ checks whether each individual one of the disks $37_1$ to $37_n$ has completed its spin-up operation (Step S120, YES/NO), and then checks whether all the disks $37_1$ to $37_n$ have completed their spin-up operations (Step S121, YES/NO). When the FC control logic and power source monitor circuit $77_1$ confirms that all the disks $37_1$ to $37_n$ have completed the spin-up operations (Step S121, YES), the FC control logic and power source monitor circuit $77_1$ completes a series of processing operations.

If the FC control logic and power source monitor circuit $77_1$ determines from the check made in Step S119 that the drive command signals have not been issued to all the disks $37_1$ to $37_n$ (Step S119, NO), the FC control logic and power source monitor circuit $77_1$ sets the count value of the internal counter (not shown) to n+1 (Step S124), and returns to Step S117. The FC control logic and power source monitor circuit $77_1$ issues a spin-up command to each of the HDDs $37_1$ to $37_n$ at intervals of several msec, by executing the processing of Step S117 to Step S124. In Step S124, in the case where the n-number of disks $37_1$ to $37_n$ are divided into, for example, groups which respectively include six disks, six disks, four disks and one disk, and are to be driven in units of the groups, the FC control logic and power source monitor circuit $77_1$ sets the internal counter (not shown) to, for example, n+Δn.

Then, if the FC control logic and power source monitor circuit $77_1$ determines from the check made in Step S115 that a failure (malfunction) has occurred in either of the first and second power sources 83 or 85 (Step S115, NO), the FC control logic and power source monitor circuit $77_1$ checks the number of disks mounted in each of the disks $37_1$ to $37_n$ (Step S122) through the Fiber Channel $43_1$, and confirms whether the checked number of disks is not smaller than "m"

which is the maximum number of disks capable of being spun up at the same time by the remaining one power source (Step S123, YES/NO). If it is determined from this confirmation that the checked number of disks is not larger than "m" (Step S123, NO), the FC control logic and power source monitor circuit $77_1$ proceeds to Step S117, whereas if the checked number of disks is not smaller than "m" (Step S123, YES), the FC control logic and power source monitor circuit $77_1$ set the count value of the internal counter (not shown) to n=0 (Step S126). This step performs the processing of clearing to zero the count value of the internal counter (not shown) for setting the identification number of a disk to be driven during the driving of each individual one of the disks $37_1$ to $37_n$, in order to start individually driving (spinning up) each of the disks $37_1$ to $37_n$. The FC control logic and power source monitor circuit $77_1$ outputs a drive command signal to the HDD ($37_1$ to $37_n$) (Step S127).

Then, the FC control logic and power source monitor circuit $77_1$ checks whether each individual one of the disks $37_1$ to $37_n$ has completed its spin-up operation (Step S128, YES/NO), and then checks whether all the disks $37_1$ to $37_n$ have completed their spin-up operations (Step S129, YES/NO). When the FC control logic and power source monitor circuit $77_1$ confirms that all the disks $37_1$ to $37_n$ have completed the spin-up operations (Step S129, YES), the FC control logic and power source monitor circuit $77_1$ completes a series of processing operations. If the check made in Step S129 shows that the spin-up of all the disks $37_1$ to $37_n$ has not yet been completed, the FC control logic and power source monitor circuit $77_1$ sets the count value of the internal counter (not shown) to n+1 (Step S130), and returns to Step S127. In Step S130, in the case where the n-number of disks $37_1$ to $37_n$ are divided into groups which respectively include six disks, six disks, four disks and one disk, and are to be driven in units of the groups, the FC control logic and power source monitor circuit $77_1$ sets the internal counter (not shown) to, for example, n+Δn.

If the FC control logic and power source monitor circuit $77_1$ determines from the self-diagnosis made in Step S113 that there is a failure (Step S113, NG), this indicates that a failure has occurred in the FC control logic and power source monitor circuit $77_1$ itself. Accordingly, the FC control logic and power source monitor circuit $77_1$ interrupts a series of processing operations immediately after having reported the occurrence of the failure to the host control logical part (not shown) (Step S125).

According to the processing flow shown in FIG. 5, in the case where a failure such as a malfunction occurs in either one of two power sources (power source circuits), a check is made as to the state of each of disks from construction information associated with each of disk units, and if the number (m) of the disks is the number of disks capable of being driven by the remaining power source (power source circuit) which is in its normal state, all the m-number of disks are spun up by the remaining power source (power source circuit) which is in the normal state.

Figure 6:
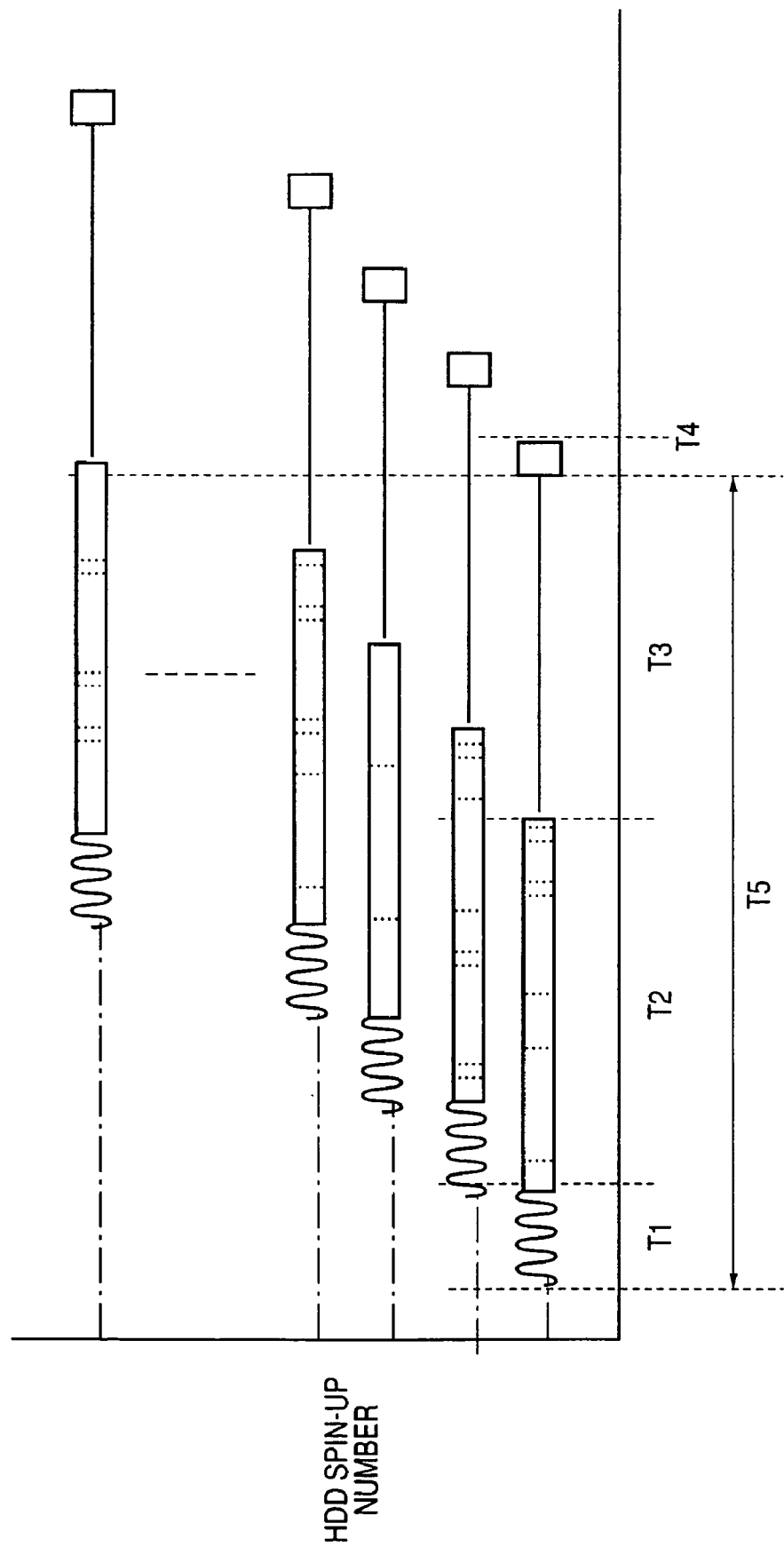
FIG. 6 is a view showing the timing of spin-up of each of the disks in the case where the FC control logic and power source monitor circuit drives (spins up) each the disks in the flowchart shown in FIG. 5.

FIG. 6 is a view showing the timing of spin-up of each of the disks $37_1$ to $37_n$ in the case where the FC control logic and power source monitor circuit $77_1$ drives (spins up) each the disks $37_1$ to $37_n$, as in the flowchart shown in FIG. 5.

In FIG. 6, similarly to FIG. 4, the vertical axis represents the number of the disks $37_1$ to $37_n$ to be spun up, while the horizontal axis represents time. Time $T_1$ represents the time required to issue a spin-up command to be given to each of the disks $37_1$ to $37_n$ by the FC control logic and power source monitor circuit $77_1$ through the Fibre Channel switch $43_1$, time $T_2$ represents the processing time of spin-up operation, and time $T_3$ represents the interval between idle seeks. Time $T_4$ represents (idle) seek time, and time $T_5$ represents the time taken until all the disks $37_1$ to $37_n$ complete their spin-up operations.

The processing operation shown in FIGS. 5 and 6 is one method for reducing the capacities of the power source circuits ($35_1$ and $35_2$) mounted in the disk unit section 31 shown in FIG. 2. As is apparent from FIG. 6, this method is to shift the issuance of a spin-up command (the outputting of a drive command signal) to each of the disks $37_1$ to $37_n$ by at least the seek time of each of the disks $37_1$ to $37_n$, thereby delaying a periodic seek interval taking place in each of the disks $37_1$ to $37_n$ after the spin-up thereof. Accordingly, it is possible to prevent the seek-time peak power consumption from concentrating at a particular time point, whereby it is possible to average the power consumption of each of the disks $37_1$ to $37_n$.

In other words, the periodic seek interval is approximately several seconds, and the time for which peak power consumption appears during each seek is approximately 2–3 msec, so that the seek time of each of the mounted disks $37_1$ to $37_n$ can be distributed within a wait time (a seek interval) which passes until a periodic seek starts, by delaying the issuance of the spin-up command to each of the disks $37_1$ to $37_n$ by several microseconds.

In addition, in the first embodiment, after the drive power source of the storage system has been turned on, if the drive power source is normal, light-emitting diodes (LEDs) (not shown) mounted on each of the disks $37_1$ to $37_n$ emit light to simultaneously change from their slowly blinking states to their lighting states. The LEDs (not shown) mounted on each of the disks $37_1$ to $37_n$ include a green LED (not shown) which indicates the operating state of the corresponding one of the disks $37_1$ to $37_n$, a red LED (not shown) which lights when the corresponding one of the disks $37_1$ to $37_n$ is in an abnormal state, and an orange LED (not shown). By causing the LEDs to perform various display operations, for example, causing the green LED and the RED LED to light at the same time, it is possible to provide various state displays such as "waiting for spin-up", "issuing a spin-up command", "performing spin-up", "failed in spin-up" and "retrying spin-up".

Furthermore, even if all the disks $37_1$ to $37_n$ are spun up at the same time as in the first embodiment of the invention, it is possible to individually confirm the state of each of the disks $37_1$ to $37_n$.

Incidentally, in prior arts, LEDs individually mounted on each of disks operate in their slowly blinking states from a moment immediately after the drive power source of the storage system has been turned on until the moment when a spin-up operation is started. During the spin-up operation, the LEDs operate in their fast blinking states, and after the spin-up operation, the LEDs change to their lighting states. This display change takes place in the LEDs in order on a one by one basis in such a manner that after the display change has taken place in one of the LEDs, the display change takes place in the next LED.

Figure 7:
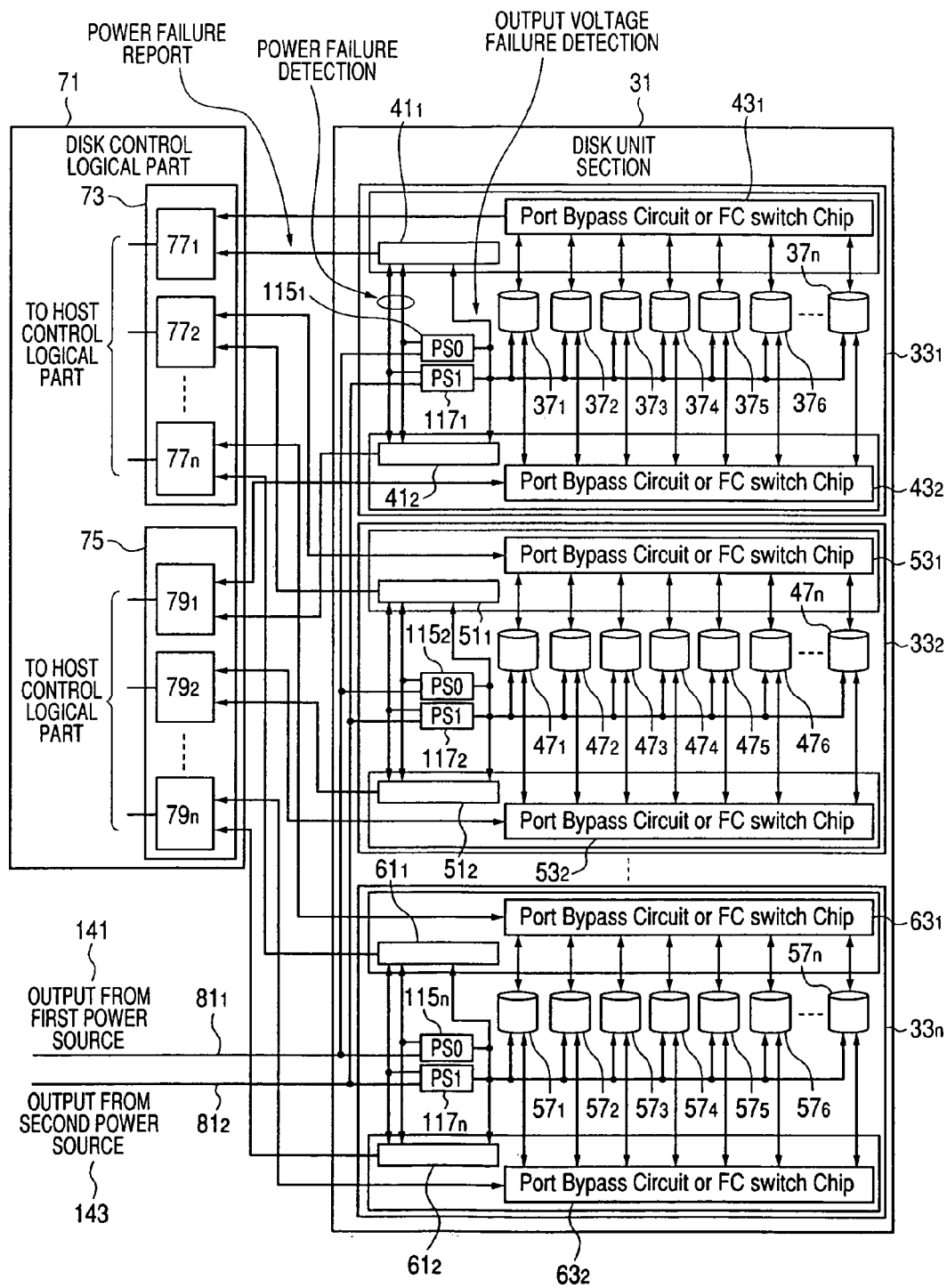
FIG. 7 is a block diagram showing details of the circuit construction of a storage system according to a second embodiment of the invention.

FIG. 7 is a block diagram showing details of the circuit construction of a storage system according to a second embodiment of the invention.

The storage system according to the second embodiment differs in construction from the storage system shown in FIG. 2 in that power source circuits $145_1$, to $145_n$ and power source circuits $147_1$ to $147_n$ are disposed in each of the disk units $33_1$ to $33_n$. The power source circuits $145_1$ to $145_n$ receive alternating-current power supplied from a first power source 141, convert the alternating-current power into direct-current power of predetermined voltage, and output the direct-current power. The power source circuits $147_1$ to $147_n$ receive alternating-current power supplied from a second power source 143, convert the alternating-current power into direct-current power of predetermined voltage, and output the direct-current power. In addition, the storage system according to the second embodiment differs from the storage system shown in FIG. 2 in that none of the disk units $33_1$ to $33_n$ is provided with the DC/DC converters $39_1$ to $39_n$, $49_1$ to $49_n$, and $59_1$ to $59_n$.

The other constructions of the storage system shown in FIG. 7 are the same as those of the storage system shown in FIG. 2, and in FIG. 7, the same constituent elements as those shown in FIG. 2 are denoted by the same reference numerals to omit the description thereof.

In the power source construction shown in FIG. 7, the output power capacity of each of the power source circuits $145_1$ to $145_n$ and $147_1$ to $147_n$ is set so that each of power source circuits $145_1$ to $145_n$ and $147_1$ to $147_n$ can supply maximum power to be consumed by each of the HDDs $37_1$ to $37_n$. Specifically, each of the power source circuits $145_1$ to $145_n$ and $147_1$ to $147_n$ has an output power capacity sufficiently large to spin up the disks $37_1$ to $37_n$. Accordingly, when the drive power source of the storage system is turned on, a check is made as to the operating state of each of the each of the power source circuits $145_1$ to $145_n$ and $147_1$ to $147_n$ before the spin-up operation of each of the disks $37_1$ to $37_n$ is started. If it is determined from the result of the check that there is no failure, all the disks $37_1$ to $37_n$ are spun up at the same time.

Accordingly, since all the disks $37_1$ to $37_n$ are spun up at the same time, the time taken from the moment when the disks $37_1$ to $37_n$ complete their spin-up operations until the moment when the disks $37_1$ to $37_n$ reach their operable states does not depend on the number of the disks $37_1$ to $37_n$ mounted, and becomes approximately 30 seconds which is approximately equal to the time required until one disk is mounted in a HDD. In the case where a disk fails to start, the disk needs to be again spun up. In this case as well, if all of the remaining disks are spun up at the same time, the disks $37_1$ to $37_n$ reach their operable states within a maximum of approximately one minute.

In the power source construction shown in FIG. 7, consideration needs to be given to a case where the disks $37_1$ to $37_n$ perform seek operations at the same time. In this case, the maximum power capacity of each of the power source circuits $145_1$ to $145_n$ and $147_1$ to $147_n$ and the first and second power supply lines $81_1$ and $81_2$ becomes a value obtained by integrating the maximum current consumption of one disk with the total number of disks, so that it is impossible to reduce the sizes and costs of the power source circuits $145_1$ to $145_n$ and $147_1$ to $147_n$ and the first and second power supply lines $81_1$ and $81_2$. However, even in the circuit construction shown in FIG. 7, it is possible to cope with reductions in such sizes and costs by adopting a construction in which the seek-time power consumption of each of the disks $37_1$ to $37_n$ is seek average power, all the disks $37_1$ to $37_n$ do not seek at the same time, and disks which are in their idle states and disks which are in their seek states exist together, and by adopting settings to cause each of the power source circuits $145_1$ to $145_n$ and $147_1$ to $147_n$ to output seek average power.

Figure 8:
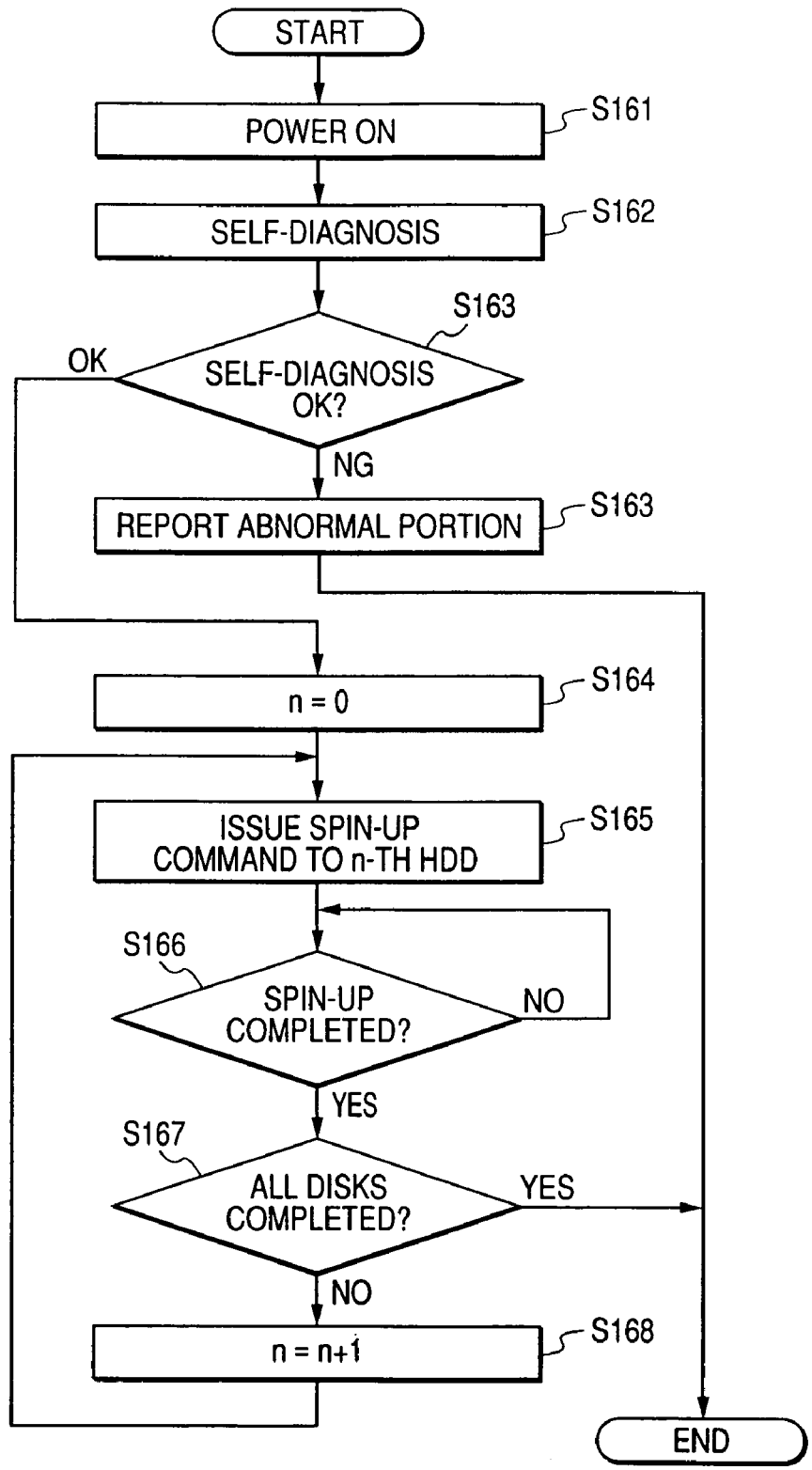
FIG. 8 is a flowchart showing the flow of processing to be executed in the construction of the storage system shown in FIG. 7 when each of the disks mounted in the disk unit is to be driven.

FIG. 8 is a flowchart showing the flow of processing to be executed in the construction of the storage system shown in FIG. 7 when each of the disks $37_1$ to $37_n$ mounted in the disk unit $33_1$ is to be driven (spun up).

In the flowchart shown in FIG. 8, when the drive power source of the storage system is turned on (Step S161), the FC control logic and power source monitor circuit $77_1$ executes the previously-described self-diagnosis operation (Step S162). If the FC control logic and power source monitor circuit $77_1$ determines from this self-diagnosis operation that there is no failure (Step S163, OK), the FC control logic and power source monitor circuit $77_1$, the FC control logic and power source monitor circuit $77_1$ clears to zero the count value of the internal counter (not shown) for setting the identification number of a disk to be driven during the driving of each individual one of the disks $37_1$ to $37_n$ (Step S100), in order to start individually driving (spinning up) each of the HDDs $37_1$ to $37_n$ (Step S164) (This is because the identification number of the first disk is set to "0").

Then, the FC control logic and power source monitor circuit $77_1$ issues a drive command signal to the disk ($37_1$ to $37_n$) (Step S165). Then, the FC control logic and power source monitor circuit $77_1$ checks whether each individual one of the disks $37_1$ to $37_n$ has completed its spin-up operation (Step S166, YES/NO), and then checks whether all the disks $37_1$ to $37_n$ have completed their spin-up operations (Step S167, YES/NO). When the FC control logic and power source monitor circuit $77_1$ confirms that all the disks $37_1$ to $37_n$ have completed the spin-up operations (Step S167, YES), the FC control logic and power source monitor circuit $77_1$ completes a series of processing operations. If the check made in Step S167 shows that the spin-up of all the disks $37_1$ to $37_n$ has not yet been completed, the FC control logic and power source monitor circuit $77_1$ sets the count value of the internal counter (not shown) to n+1 (Step S168), and returns to Step S165. In Step S168, in the case where the n-number of disks $37_1$ to $37_n$ are divided into groups which respectively include six disks, six disks, four disks and one disk, and are to be driven in units of the groups, the FC control logic and power source monitor circuit $77_1$ sets the internal counter (not shown) to, for example, n+Δn.

If the FC control logic and power source monitor circuit $77_1$ determines from the self-diagnosis made in Step S163 that there is a failure (Step S163, NG), this indicates that a failure has occurred in the FC control logic and power source monitor circuit $77_1$ itself. Accordingly, the FC control logic and power source monitor circuit $77_1$ interrupts a series of processing operations immediately after having reported the occurrence of the failure to the host control logical part (not shown) (Step S169).

Figure 9:
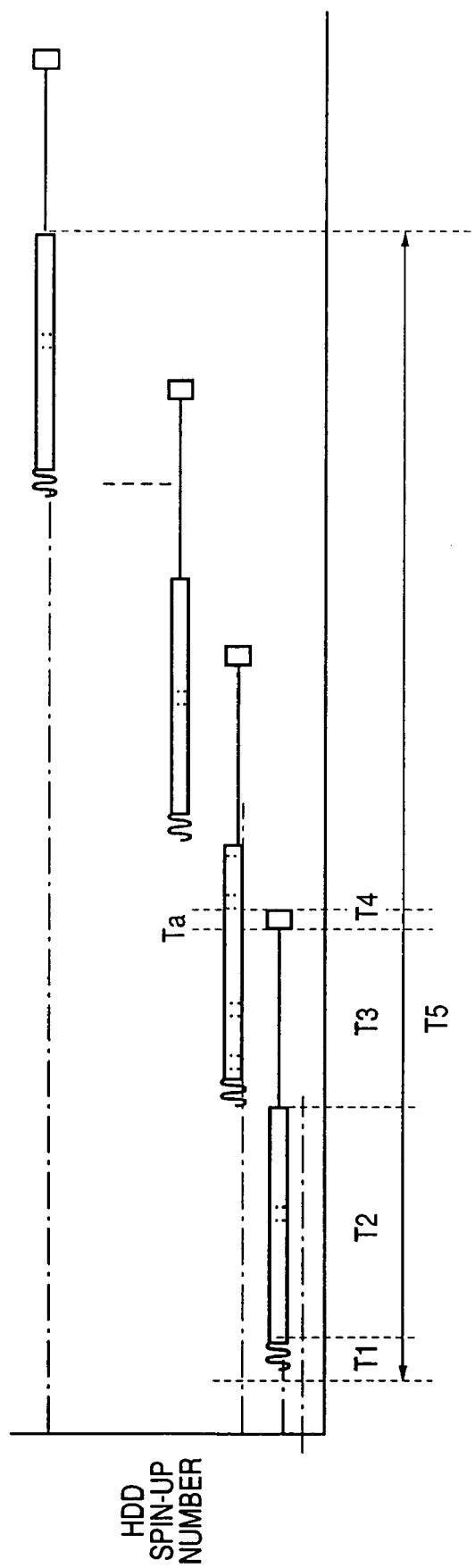
FIG. 9 is a view showing the timing of spin-up of each of the disks in the case where the FC control logic and power source monitor circuit drives (spins up) each of the disks in the flowchart shown in FIG. 7.

FIG. 9 is a view showing the timing of spin-up of each of the disks $37_1$ to $37_n$ in the case where the FC control logic and power source monitor circuit $77_1$ drives (spins up) each of the disks $37_1$ to $37_n$ in the flowchart shown in FIG. 7.

In FIG. 9, as in FIGS. 4 and 6, the vertical axis represents the number of the disks $37_1$ to $37_n$ to be spun up, while the horizontal axis represents time. Time $T_1$ represents the time required to issue a spin-up command to be given to each of the disks $37_1$ to $37_n$ by the FC control logic and power source monitor circuit $77_1$, time $T_2$ represents the processing time of spin-up operation, and time $T_3$ represents the interval between idle seeks. Time $T_4$ represents (idle) seek time, and time $T_5$ represents the time taken until all the disks $37_1$ to $37_n$ complete their spin-up operations.

As shown in FIG. 9, so long as the idle seek times of the respective disks $37_1$ to $37_n$ do not overlap one another, it is possible to prevent shortage of the power required to spin up each of the disks $37_1$ to $37_n$, even if a small capacity type of power sources are used as the power sources (the power source circuits $145_1$ to $145_n$ and $147_1$ to $147_n$). As methods for preventing the overlap of the idle seek times of the respective disks $37_1$ to $37_n$, there are a method of shifting the time (spin-up processing time) of issuance of a spin-up command to each of the disks $37_1$ to $37_n$ and a method of providing dummy access (a dummy read command) to each of the disks $37_1$ to $37_n$ from the FC control logic and power source monitor circuit $77_1$. The latter method makes use of the fact that when the host system 15 actually accesses the storage system, none of the disks $37_1$ to $37_n$ can perform an idle seek operation. As the result of the insertion of this dummy access, the idle seek times of the respective disks $37_1$ to $37_n$ are shifted from one another. However, the probability that the two power sources (the power source circuits $145_1$ to $145_n$ and $147_1$ to $147_n$ break down during that time is extremely small, and no practical problems occur.

Although the preferred embodiments of the invention have been described hereinabove, these embodiments are intended to describe the invention by way of illustration only, and are not to be considered as limiting the invention. The invention can be embodied in various other forms.

What is claimed is:

1. A storage system, comprising:
   a controller configured for transferring data to a plurality of storage regions;
   at least one data line being used to relay data transferred from said controller;
   a plurality of disk drive units coupled to said data line and having a plurality of disk drives which have said storage regions;
   at least one first AC/DC power supply being inputted AC input and supplying said disk drive units;
   at least one second AC/DC power supply being inputted AC input and supplying said disk drive units with DC power;
   at least one DC power supply coupled to both a first power line and a second power line and supplying said disk drive units with DC power which are lower than inputted DC power;
   at least one power source state detecting unit detecting a state of DC power supplied to said disk drive units, wherein said controller controls spin up starting of said disk drive units based on a result of detecting by said power source state detecting unit, and
   wherein said controller controls the number of said disk drive units for starting spin up based on the result of detecting by said power source state detecting unit.

2. A storage system according to claim 1, further comprising:
   A plurality of DC power supplies each coupled to both said first power supply line and said second power supply line, wherein each of said plurality of DC power supplies is configured to supply a corresponding one of said disk drives with DC power lower than the inputted DC power.

3. A storage system according to claim 1, wherein said power source state detecting unit is configured to detect a status of the AC/DC power supply.

4. A storage system according to claim 1, wherein said power source state detecting unit is configured to detect a status of at least one of the first power line and the second power line.

5. A storage system according to claim 1, wherein said controller is configured to report to an upper controller an abnormal state of the DC power supplied to the disk drive units.

6. A storage system, comprising:
   a controller configured for transferring data to a plurality of storage regions;
   at least one data line being used to relay data transferred from said controller;
   a plurality of disk drive units coupled to said data line and having a plurality of disk drives which have said storage regions;
   at least one first AC/DC power supply being inputted AC input and supplying said disk drive units;
   at least one second AC/DC power supply being inputted AC input and supplying said disk drive units with DC power;
   at least one DC power supply coupled to both a first power line and a second power line and supplying said disk drive units with DC power which are lower than inputted DC power;
   at least one power source state detecting unit detecting a state of DC power supplied to said disk drive units, wherein said controller controls spin up starting of said disk drive units based on a result of detecting by said power source state detecting unit, and
   wherein said controller controls the number of said disk drive units for starting spin up individually or at least as one group based on the result of detecting by said power source state detecting unit.

7. A storage system according to claim 6, further comprising:
   a plurality of DC power supplies each coupled to both said first power supply line and said second power supply line, wherein each of said plurality of DC power supplies is configured to supply a corresponding one of said disk drives with DC power lower than the inputted DC power.

8. A storage system according to claim 6, wherein said power source state detecting unit is configured to detect a status of the AC/DC power supply.

9. A storage system according to claim 6, wherein said power source state detecting unit is configured to detect a status of at least one of the first power line and the second power line.

10. A storage system according to claim 6, wherein said controller is configured to report to an upper controller an abnormal state of the DC power supplied to the disk drive units.

11. A storage system, comprising:
    a controller configured for transferring data to a plurality of storage regions;
    at least one data line being used to relay data transferred from said controller;
    a plurality of disk drive units coupled to said data line and having a plurality of disk drives which have said storage regions;
    at least one first AC/DC power supply being inputted AC input and supplying said disk drive units;
    at least one second AC/DC power supply being inputted AC input and supplying said disk drive units with DC power;
    at least one DC power supply coupled to both a first power line and a second power line and supplying said disk drive units with DC power which are lower than inputted DC power;
    at least one power source state detecting unit detecting a state of DC power supplied to said disk drive units, wherein said controller controls spin up starting of said disk drive units based on a result of detecting by said power source state detecting unit, and
    wherein said controller controls the number of said disk drives for starting spin up based on the result of detecting by said power source state detecting unit.

12. A storage system according to claim 11, wherein said controller controls the number of said disk drives for starting spin up as individual disk drives or as at least one group of said disk drives based on the result of detecting by said power source state detecting unit.

13. A storage system according to claim 11, further comprising:
  A plurality of DC power supplies each coupled to both said first power supply line and said second power supply line, wherein each of said plurality of DC power supplies is configured to supply a corresponding one of said disk drives with DC power lower than the inputted DC power.

14. A storage system according to claim 11, wherein said power source state detecting unit is configured to detect a status of the AC/DC power supply.

15. A storage system according to claim 11, wherein said power source state detecting unit is configured to detect a status of at least one of the first power line and the second power line.

16. A storage system according to claim 11, wherein said controller is configured to report to an upper controller an abnormal state of the DC power supplied to the disk drive units.

17. A storage system, comprising:
  a controller configured for transferring data to a plurality of storage regions;
  at least one data line being used to relay data transferred from said controller;
  a plurality of disk drive units coupled to said data line and having a plurality of disk drives which have said storage regions;
  at least one first AC/DC power supply being inputted AC input and supplying said disk drive units;
  at least one second AC/DC power supply being inputted AC input and supplying said disk drive units with DC power;
  at least one DC power supply coupled to both a first power line and a second power line and supplying said disk drive units with DC power which are lower than inputted DC power;
  at least one power source state detecting unit detecting a state of DC power supplied to said disk drive units, wherein said controller controls spin up starting of said disk drive units based on a result of detecting by said power source state detecting unit, and
  wherein said controller controls the number of said disk drives for starting spin up based on the result of detecting one of a normal state and an abnormal state by said power source state detecting unit.

18. A storage system according to claim 17, wherein, when an abnormal state is detected, said controller controls the number of said disk drives for starting spin up based on a level of the abnormal state detected by said power source state detecting unit.

19. A storage system according to claim 17, further comprising:
  A plurality of DC power supplies each coupled to both said first power supply line and said second power supply line, wherein each of said plurality of DC power supplies is configured to supply a corresponding one of said disk drives with DC power lower than the inputted DC power.

20. A storage system according to claim 17, wherein said power source state detecting unit is configured to detect a status of the AC/DC power supply.

21. A storage system according to claim 17, wherein said power source state detecting unit is configured to detect a status of at least one of the first power line and the second power line.

22. A storage system according to claim 17, wherein said controller is configured to report to an upper controller an abnormal state of the DC power supplied to the disk drive units.

23. A storage system, comprising:
  a controller configured for transferring data to a plurality of storage regions;
  at least one data line being used to relay data transferred from said controller;
  a plurality of disk drive units coupled to said data line and having a plurality of disk drives which have said storage regions;
  at least one first AC/DC power supply being inputted AC input and supplying said disk drive units;
  at least one second AC/DC power supply being inputted AC input and supplying said disk drive units with DC power;
  at least one DC power supply coupled to both a first power line and a second power line and supplying said disk drive units with DC power which are lower than inputted DC power;
  at least one power source state detecting unit detecting a state of DC power supplied to said disk drive units, wherein said controller controls spin up starting of said disk drive units based on a result of detecting by said power source state detecting unit, and
  wherein said power source state detecting unit is configured to detect a status of the at least one DC power supply.

24. A storage system according to claim 23, further comprising:
  a plurality of DC power supplies each coupled to both said first power supply line and said second power supply line, wherein each of said plurality of DC power supplies is configured to supply a corresponding one of said disk drives with DC power lower than the inputted DC power.

25. A storage system according to claim 23, wherein said power source state detecting unit is configured to detect a status of the AC/DC power supply.

26. A storage system according to claim 23, wherein said power source state detecting unit is configured to detect a status of at least one of the first power line and the second power line.

27. A storage system according to claim 23, wherein said controller is configured to report to an upper controller an abnormal state of the DC power supplied to the disk drive units.

28. A storage system, comprising:
  a controller configured for transferring data to a plurality of storage regions;
  at least one data line being used to relay data transferred from said controller;
  a plurality of disk drive units coupled to said data line and having a plurality of disk drives which have said storage regions;
  at least one first AC/DC power supply being inputted AC input and supplying said disk drive units;
  at least one second AC/DC power supply being inputted AC input and supplying said disk drive units with DC power;
  at least one DC power supply coupled to both a first power line and a second power line and supplying said disk drive units with DC power which are lower than inputted DC power;
  at least one power source state detecting unit detecting a state of DC power supplied to said disk drive units, wherein said controller controls spin up starting of said disk drive units based on a result of detecting by said power source state detecting unit;
  a plurality of power source state detecting units for detecting a state of the DC power supplied to said disk drive units, each of said plurality of power source detecting units corresponding to a group of said disk drive units; and a plurality of data lines being used to relay data transferred from said controller, each of said plurality of data lines corresponding to a group of said disk drive units, wherein said controller includes a plurality of control circuits each corresponding to each of said plurality of power source detecting units, each of said plurality of data lines and each group of disk drive units, each of said plurality of control circuits is operatively connected to receive a state of DC power supplied from the corresponding power source state detecting unit in order to control the spin up starting of the corresponding group of disk drive units.

29. A storage system according to claim 28, wherein each of said plurality of control circuits is configured to report to an upper controller an abnormal state of the DC power supplied to the corresponding group of disk drive units.

30. A storage system according to claim 28, further comprising:
a plurality of DC power supplies each coupled to both said first power supply line and said second power supply line, wherein each of said plurality of DC power supplies is configured to supply a corresponding one of said disk drives with DC power lower than the inputted DC power.

31. A storage system according to claim 28, wherein said power source state detecting unit is configured to detect a status of the AC/DC power supply.

32. A storage system according to claim 28, wherein said power source state detecting unit is configured to detect a status of at least one of the first power line and the second power line.

33. A storage system according to claim 28, wherein said controller is configured to report to an upper controller an abnormal state of the DC power supplied to the disk drive units.

34. A storage system, comprising:
a controller configured for transferring data to a plurality of storage regions;
at least one data line being used to relay data transferred from said controller;
a plurality of disk drive units coupled to said data line and having a plurality of disk drives which have said storage regions;
at least one first AC/DC power supply being inputted AC input and supplying said disk drive units;
at least one second AC/DC power supply being inputted AC input and supplying said disk drive units with DC power;
at least one DC power supply coupled to both a first power line and a second power line and supplying said disk drive units with DC power which are lower than inputted DC power;
at least one power source state detecting unit detecting a state of DC power supplied to said disk drive units, wherein
said controller controls the number of said disk drive units for spin up starting based on the result of detecting by said power source state detecting unit.

35. A storage system according to claim 34, further comprising:
a plurality of DC power supplies each coupled to both said first power supply line and said second power supply line, wherein each of said plurality of DC power supplies is configured to supply a corresponding one of said disk drives with DC power lower than the inputted DC power.

36. A storage system according to claim 34, wherein said power source state detecting unit is configured to detect a status of the AC/DC power supply.

37. A storage system according to claim 34, wherein said power source state detecting unit is configured to detect a status of at least one of the first power line and the second power line.

38. A storage system according to claim 34, wherein said controller is configured to report to an upper controller an abnormal state of the DC power supplied to the disk drive units.

39. A storage system, comprising:
a controller configured for transferring data to a plurality of storage regions;
at least one data line being used to relay data transferred from said controller;
a plurality of disk drive units coupled to said data line and having a plurality of disk drives which have said storage regions;
at least one first AC/DC power supply being inputted AC input and supplying said disk drive units;
at least one second AC/DC power supply being inputted AC input and supplying said disk drive units with DC power;
at least one DC power supply coupled to both a first power line and a second power line and supplying said disk drive units with DC power which are lower than inputted DC power;
at least one power source state detecting unit detecting a state of DC power supplied to said disk drive units, wherein
the number of said disk drive units for spin up starting is controlled based on the result of detecting by said power source state detecting unit.

40. A storage system according to claim 39, further comprising:
a plurality of DC power supplies each coupled to both said first power supply line and said second power supply line, wherein each of said plurality of DC power supplies is configured to supply a corresponding one of said disk drives with DC power lower than the inputted DC power.

41. A storage system according to claim 39, wherein said power source state detecting unit is configured to detect a status of the AC/DC power supply.

42. A storage system according to claim 39, wherein said power source state detecting unit is configured to detect a status of at least one of the first power line and the second power line.

43. A storage system according to claim 39, wherein said controller is configured to report to an upper controller an abnormal state of the DC power supplied to the disk drive units.

* * * * *